(12) United States Patent
Iriyama et al.

(10) Patent No.: US 9,123,928 B2
(45) Date of Patent: Sep. 1, 2015

(54) METHOD FOR DOPING AND DEDOPING LITHIUM INTO AND FROM NEGATIVE ELECTRODE AND METHOD FOR PRODUCING NEGATIVE ELECTRODE FOR LITHIUM SECONDARY BATTERY

(75) Inventors: Jiro Iriyama, Tokyo (JP); Tetsuya Kajita, Tokyo (JP); Daisuke Kawasaki, Tokyo (JP); Tatsuji Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 100 days.

(21) Appl. No.: 14/114,948

(22) PCT Filed: Apr. 6, 2012

(86) PCT No.: PCT/JP2012/059540
§ 371 (c)(1),
(2), (4) Date: Oct. 31, 2013

(87) PCT Pub. No.: WO2012/165049
PCT Pub. Date: Dec. 6, 2012

(65) Prior Publication Data
US 2014/0076729 A1    Mar. 20, 2014

(30) Foreign Application Priority Data

May 27, 2011   (JP) .................................. 2011-119232

(51) Int. Cl.
  *H01M 4/04*    (2006.01)
  *H01M 4/134*   (2010.01)
  *H01M 4/1395*  (2010.01)
  *H01M 4/485*   (2010.01)

(52) U.S. Cl.
  CPC ............ *H01M 4/0459* (2013.01); *H01M 4/134* (2013.01); *H01M 4/1395* (2013.01); *H01M 4/485* (2013.01); *Y02E 60/122* (2013.01)

(58) Field of Classification Search
  CPC .... H01M 4/0459; H01M 4/134; H01M 4/485
  See application file for complete search history.

(56) References Cited

FOREIGN PATENT DOCUMENTS

| JP | 2997741 | 1/2000 |
| JP | 2005-235734 | 9/2005 |

(Continued)

OTHER PUBLICATIONS

International Search Report mailed on Jul. 3, 2012.

*Primary Examiner* — Helen O Conley
(74) *Attorney, Agent, or Firm* — Finnegan, Henderson, Farabow, Garrett & Dunner LLP (57) ABSTRACT

The object of an exemplary embodiment of the invention is to provide a negative electrode having excellent cycle property. An exemplary embodiment of the invention a method for doping and dedoping lithium for the first time after a negative electrode for a lithium secondary battery comprising silicon oxide as an active material is produced, comprising doping the lithium within the following current value range (A) and within the following doped amount range (B); current value range (A): a range of a current value in which a doped amount in which only one peak appears at 1 V or less on the V-dQ/dV curve becomes maximum, wherein the V-dQ/dV curve represents a relationship between voltage V of the negative electrode with respect to a lithium reference electrode and dQ/dV that is a ratio of variation dQ of lithium dedoped amount Q in the negative electrode to variation dV of the voltage V, and doped amount range (B): a range of a doped amount in which only one peak appears at 1 V or less on the V-dQ/dV curve.

18 Claims, 2 Drawing Sheets

(56) References Cited

FOREIGN PATENT DOCUMENTS

| JP | 3771846 | 4/2006 |
|----|---------|--------|
| JP | 4088993 | 5/2008 |
| JP | 2008-177346 | 7/2008 |
| JP | 4212439 | 1/2009 |
| JP | 2009-076372 | 4/2009 |
| JP | 2009-076373 | 4/2009 |
| WO | WO 2010/071166 A1 | 6/2010 |

METHOD FOR DOPING AND DEDOPING LITHIUM INTO AND FROM NEGATIVE ELECTRODE AND METHOD FOR PRODUCING NEGATIVE ELECTRODE FOR LITHIUM SECONDARY BATTERY

CROSS-REFERENCE TO RELATED PATENT APPLICATIONS

This application is a National Stage Entry of International Application No. PCT/JP2012/059540, filed Apr. 6, 2012, which claims priority from Japanese Patent Application No. 2011-119232, filed May 27, 2011. The entire contents of the above-referenced applications are expressly incorporated herein by reference.

TECHNICAL FIELD

The present invention relates to a method for doping and dedoping lithium into and from a negative electrode and a method for producing a negative electrode for a lithium secondary battery.

BACKGROUND ART

Patent document 1 discloses a lithium secondary battery having a negative electrode using silicon oxide as a negative electrode active material.

Also, Patent document 2 discloses a method for discharging a non-aqueous electrolyte secondary battery using silicon oxide containing lithium as a negative electrode active material. More specifically, Patent document 2 discloses a method for controlling a discharge of a non-aqueous electrolyte secondary battery by discharging it in a range where the voltage of the negative electrode with respect to lithium reference electrode is not more than 0.6 V.

Also, Patent document 3 discloses a non-aqueous secondary battery in which the negative electrode active material is a silicon compound which is represented by $M_xSi$ and in which the crystallinity calculated by differential scanning calorimetry is in a range of 10 to 60%. Also, it discloses a charge method in which this non-aqueous secondary battery is used and in which the charge is finished when the potential of the negative electrode with respect to metal lithium is a potential higher than 100 mV.

Also, Patent document 4 discloses a method for using a lithium secondary battery in which an electrode having an active material layer containing silicon on a collector is used as a negative electrode. More specifically, it discloses a method for using the battery in which it is charged and discharged at a negative electrode potential of 0.8 V or less (vs. Li/Li$^+$) except for the first charge.

Also, Patent document 5 discloses a secondary battery which has a negative electrode containing silicon (Si) as a constituent element in which a molar ratio (Li/Si) of lithium atom to silicon atom (Li/Si) is 4.0 or less.

CITATION LIST

Patent Document

Patent document 1: JP 2997741 B2
Patent document 2: JP 4088993 B2
Patent document 3: JP 3771846 B2
Patent document 4: JP 4212439 B2
Patent document 5: JP 2005-235734 A

SUMMARY OF THE INVENTION

Problem to be Solved by the Invention

However, in the lithium secondary battery using silicon oxide as a negative electrode active material as disclosed in Patent document 1, the capacity retention ratio may be deceased by repeated charging and discharging, and the improvement of the cycle property is expected.

Also, in the batteries disclosed in Patent documents 2 to 5, there are some cases in which the cycle properties of the lithium secondary batteries cannot be improved.

Thus, the object of the present invention is to provide a negative electrode having excellent cycle property.

Means of Solving the Problem

The present inventors seriously made a study and thought that, in the case of using silicon oxide as a negative electrode active material, lithium was doped locally into silicon oxide, and thereby a decrease in the capacity retention ratio due to the repeated charge and discharge occurred. In the lithium secondary battery having a negative electrode using silicon oxide as a negative electrode active material, the lithium ion conductivity of silicon oxide is low before lithium is doped and becomes higher as the amount of doped lithium increases. Therefore, it is easy for the concentration of lithium to become unevenly distributed in the negative electrode, and the portion containing lithium at a high concentration in the negative electrode and an unreacted portion tend to be mixed. When charging and discharging are repeated in a case in which the concentration of lithium is unevenly distributed in the negative electrode, the volume change accompanied with the charge and discharge becomes large in a portion where the concentration of lithium is high. Therefore, the present inventors have thought that the portion where the concentration of lithium is high falls from the collector, which leads to the decrease in discharge capacity.

Thus, the present inventors carried out intense study about a method for reducing a uneven state of the negative electrode, and reached an exemplary embodiment of the invention.

One of the exemplary embodiments of the invention is:
a method for doping and dedoping lithium for the first time after a negative electrode for a lithium secondary battery comprising silicon oxide as an active material is produced, comprising doping the lithium within the following current value range (A) and within the following doped amount range (B);

current value range (A): a range of a current value in which a doped amount, where only one peak appears at 1 V or less on the V-dQ/dV curve, becomes maximum, wherein the V-dQ/dV curve represents a relationship between voltage V of the negative electrode with respect to a lithium reference electrode and dQ/dV that is a ratio of variation dQ of lithium dedoped amount Q in the negative electrode to variation dV of the voltage V, and doped amount range (B): a range of a doped amount in which only one peak appears at 1 V or less on the V-dQ/dV curve.

One of the exemplary embodiments of the invention is:
a method for doping and dedoping lithium for the first time after a negative electrode for a lithium secondary battery comprising silicon oxide as an active material is produced, comprising doping the lithium
in a doped amount in which only one peak appears at 1 V or less on a V-dQ/dV curve and at a current value in which the doped amount becomes maximum, wherein the V-dQ/dV curve represents a relationship between voltage V of the negative electrode with respect to a lithium reference electrode and dQ/dV that is a ratio of variation dQ of lithium dedoped amount Q in the negative electrode to variation dV of the voltage V.

One of the exemplary embodiments of the invention is:

a negative electrode for a lithium secondary battery in which lithium is doped and dedoped by the above-mentioned method.

One of the exemplary embodiments of the invention is:

a lithium secondary battery, comprising the above-mentioned negative electrode.

One of the exemplary embodiments of the invention is:

a method for producing a negative electrode for a lithium secondary battery, comprising:

(1) forming a negative electrode active material layer comprising silicon oxide as an active material, and (2) doping and dedoping lithium into and from the negative electrode active material layer, wherein the doping in step (2) is carried out within the following current value range (A) and within the following doped amount range (B);

current value range (A): a range of a current value in which a doped amount in which only one peak appears at 1 V or less on the V-dQ/dV curve becomes maximum, wherein the V-dQ/dV curve represents a relationship between voltage V of the negative electrode active material layer with respect to a lithium reference electrode and dQ/dV that is a ratio of variation dQ of lithium dedoped amount Q in the negative electrode active material layer to variation dV of the voltage V, and doped amount range (B): a range of a doped amount in which only one peak appears at 1 V or less on the V-dQ/dV curve.

One of the exemplary embodiments of the invention is:

a method for producing a negative electrode for a lithium secondary battery, comprising:

(1) forming a negative electrode active material layer comprising silicon oxide as an active material, and (2) doping and dedoping lithium into and from the negative electrode active material layer, wherein the doping in step (2) is carried out in a doped amount in which only one peak appears at 1 V or less on a V-dQ/dV curve and at a current value in which the doped amount becomes maximum, wherein the V-dQ/dV curve represents a relationship between voltage V of the negative electrode active material layer with respect to a lithium reference electrode and dQ/dV that is a ratio of variation dQ of lithium dedoped amount Q in the negative electrode active material layer to variation dV of the voltage V.

Effect of the Invention

By using a method for doping and dedoping lithium according to an exemplary embodiment of the invention, a negative electrode having an excellent capacity retention ratio after a charge and discharge cycle can be provided.

Also, by a production method according to an exemplary embodiment of the invention, a negative electrode having an excellent capacity retention ratio after a charge and discharge cycle can be provided.

MODE FOR CARRYING OUT THE INVENTION

The present inventors have found that, if lithium is electrochemically doped into silicon oxide, only one gentle peak that has a top at around 0.5 V appears at 1 V (Li/Li$^+$) or less on the V-dQ/dV curve at the dedoping time when the doped amount is small. Also, it has been found that the peak intensity of this first peak becomes large as the doped amount is increased and a second peak further appears at around 0.3 V which overlaps the first peak when the doped amount exceeds a certain value. Hereinafter, the first peak is represented by a higher potential side peak, and the second peak is represented by a lower potential side peak. The top of the higher potential side peak is at around 0.5 V, and the top of the lower potential side is at around 0.3 V. Also, it has been found that the peak intensity at the lower potential side becomes large if the doped amount is increased (see FIG. 1). Note that, V represents a potential of the negative electrode with respect to Li, and dQ/dV represents battery capacity change with respect to the voltage change of the negative electrode.

These phenomena are thought to indicate that, if lithium is electrochemically doped into silicon oxide, two phases having a different oxidation-reduction potential are generated when the doped amount exceeds a certain value.

Figure 2:
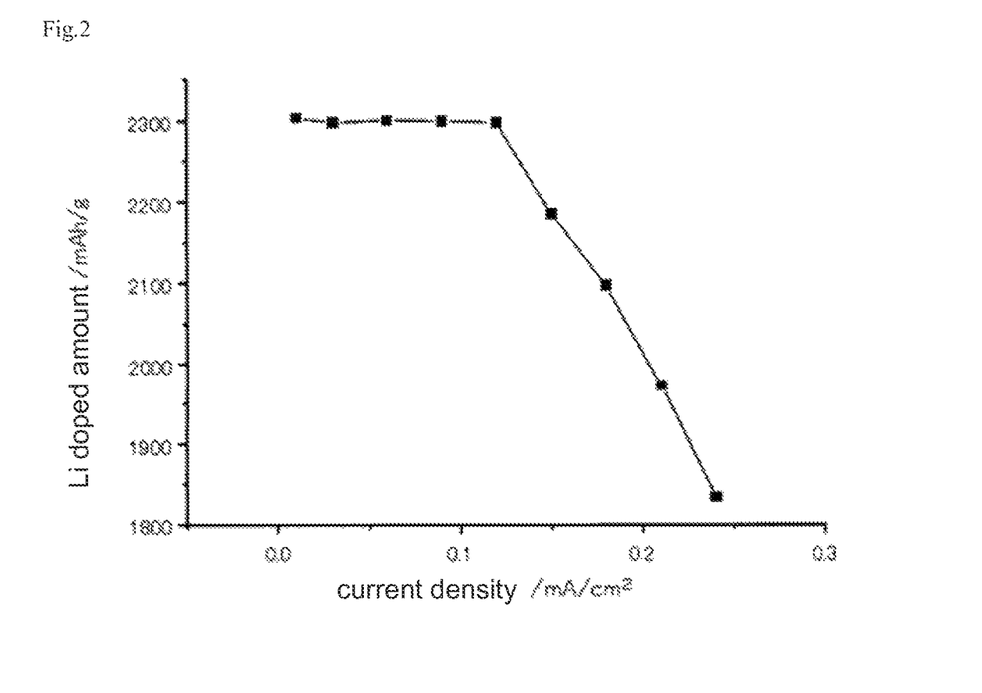
FIG. 2 is a graph showing a relationship between an upper limit value of a lithium doped amount with respect to unit weight of SiO, in which only one peak appears at 1 V (Li/Li$^+$) or less on a V-dQ/dV curve, and a lithium doping current density with respect to a unit area of a negative electrode.

Further, the present inventors have found that the lithium doped amount, in which a lower potential side peak at around 0.3 V appears, is changed by the current value in the doping for the first time after a negative electrode is produced (see FIG. 2). In the doping for the first time after it is produced, if the current value is large, the second peak will appear in a small doped amount. As well, if doping is carried out at a current that has decreased from the current value, the doped amount in which the lower potential side peak comes to appear, that is, the upper limit value of the doped amount, in which only one peak appears, gradually become large. However, if the current value becomes a certain value or less, the doped amount, in which the lower potential side peak appears, becomes constant and no longer increases. FIG. 2 shows a relationship between the upper limit value of doped amount in which only one peak appears and the current density in the case of doping lithium into SiO. In FIG. 2, with decreasing the current density, the upper limit value of the doped amount in which only one peak appears gradually becomes large and reaches approximately 2300 mAh/g. After that, even if the current is decreased, the upper limit value of the doped amount in which only one peak appears becomes approximately constant and is a maximum value.

This is thought to be a phenomenon due to the fact that the lithium ion conductivity of silicon oxide before lithium is doped is very small in comparison with silicon oxide where lithium is doped. Since the ion conductivity of silicon oxide is small, when lithium is doped with a large current, the concentration of lithium easily becomes unevenly distributed in the negative electrode. As well, since the portion that has a high concentration of lithium and the portion where a lithium reaction has not occurred, are mixed, it is assumed that a second peak will appear with a small doped amount. On the other hand, if the doping is carried out with a sufficient small current value, since the Li doping reaction uniformly occurs throughout silicon oxide, it is assumed that the second lower potential side peak will appear with a certain Li doped amount in which the intrinsic phase transition occurs.

The Li doped amount in which this intrinsic phase transition occurs is changed according to a ratio of silicon (Si) and oxygen (O) in silicon oxide, and is approximately 2300 mAh/g in the case of SiO. When the ratio of oxygen in silicon oxide is increased, this value tends to become small. When the ratio of silicon is increased, this value tends to become large. SiO is preferably stoichiometric.

Thus, the present inventors have found that when a sufficiently small current is used in a negative electrode for a lithium secondary battery using silicon oxide as an active material, the lithium doped amount in which only one peak, due to the oxidation-reduction reaction of silicon oxide, appears at 1 V or less on the V-dQ/dV curve can be maximum. Further, when lithium is doped into silicon oxide at this sufficiently small current value, it has been understood that lithium can be uniformly doped.

Further, the present inventors have found that, by carrying out a lithium doping for the first time after a negative electrode is produced at a sufficiently small current as described above in a doped amount or less in which only one peak described above appears at a higher potential side, and thereafter by carrying out dedoping, the charge and discharge reaction uniformly proceeds in later use. The reason why the negative electrode performance is improved is presumed to be that the path through which lithium uniformly penetrates into silicon oxide is formed by carrying out a lithium doping and dedoping in such a condition for the first time after the negative electrode is produced, but which does not limit the present invention.

Here, individual peak electric potentials and peak intensities are evaluated by fitting original data on the V-dQ/dV curve by, for example, overlapping any Gauss function. When fitting is carried out, the data can be smoothed to remove a noise. For example, as a smoothing processing, SAVITZKY-GOLAY algorithm, adjacent average processing, or the like can be used. After fitting, the peak intensity can be evaluated by calculating the area of each peak. For example, as the software by which data fitting, smoothing, and area calculation can be conducted, ORIGIN (a software for analyzing data made by ORIGINLAB CORPORATION, see HTTP://WWW.LIGHTSTONE.CO.JP/ORIGIN/PA.HTM). This software has NLSF (NONLINEAR LEAST SQUARES FITTER—non-linear curve mechanism) in which least-square method is applied, and fitting of a curve having any plural peak by Gauss function can be conducted.

From the above, the present inventors could find the following exemplary embodiment of the invention.

One of the exemplary embodiments of the invention is:

a method for doping and dedoping lithium for the first time since a negative electrode for a lithium secondary battery comprising silicon oxide as an active material is produced, wherein the method is carried out within the following current value range (A) and within the following doped amount range (B);

current value range (A): a range of a current value in which a doped amount in which only one peak appears at 1 V or less on the V-dQ/dV curve becomes maximum, wherein the V-dQ/dV curve represents a relationship between voltage V of the negative electrode with respect to a lithium reference electrode and dQ/dV that is a ratio of variation dQ of lithium dedoped amount Q in the negative electrode to variation dV of the voltage V, and doped amount range (B): a range of a doped amount in which only one peak appears at 1 V or less on the V-dQ/dV curve.

In the V-dQ/dV curve, V represents the potential of the negative electrode with respect to Li, and dQ/dV represents the battery capacity change with respect to the voltage change of the negative electrode. In other words, the V-dQ/dV graph represents the relationship between dQ/dV, which is a ratio of variation dQ of discharge capacity Q of the lithium secondary battery to variation dV of voltage V with respect to the lithium reference electrode of the negative electrode, and the voltage V.

As explained above, in the first doping, if the current value is large, the second peak appears in a small doped amount. And, if doping is carried out at a current which is decreased from the current value, the doped amount in which the lower potential side peak starts to appear, that is the upper limit value of the doped amount in which only one peak appears at 1 V or less, gradually becomes large. However, if the current value becomes a certain value or less, the upper limit value of the doped amount in which only one peak appears at 1 V or less becomes constant and maximum. This doped amount when the upper limit of the doped amount in which only one peak appears at 1 V or less becomes constant, comes to be a maximum value of the doped amount in which only one peak appears at 1 V or less. And, in an exemplary embodiment of the invention, lithium is doped by applying the current within the current value range in which the doped amount, in which only one peak appears at 1 V or less, becomes maximum.

More specifically, the current value, where the doped amount in which only one peak appears at 1 V or less becomes maximum, is a current value within the current value range in which the upper limit of the doped amount, where only one peak appears at 1 V or less, becomes approximately constant and maximum, as shown in FIG. 2. For example, in the case where the silicon oxide is SiO and where the current density is approximately 0.12 A/cm$^2$ or less, the doping amount, in which only one peak appears at 1 V or less, becomes maximum. In the current value range in which the current density is approximately 0.12 A/cm$^2$ or less, the upper limit value of the doped amount, in which only one peak appears at 1 V or less, becomes approximately constant and maximum, and the doped amount is approximately 2300 mAh/g. In other words, in the case where the silicon oxide is SiO, the current value, in which the doped amount where only one peak appears at 1 V or less becomes maximum, means a current value such that the doped amount in which only one peak appears at 1 V or less comes to be approximately 2300 mAh/g, and the current density of the current value is approximately 0.12 A/cm$^2$ or less.

In an exemplary embodiment of the invention, the doped amount is in a range in which only one peak appears at 1 V or less on the V-dQ/dV curve. Also, from the standpoint that a path is more uniformly formed, lithium is preferably doped to the maximum of the doped amount in which only one peak appears at 1 V or less on the V-dQ/dV curve.

From the standpoint that a path of lithium can be uniformly formed, the doped amount range (B) is, for example, a half or more of a maximum value of the doped amount in which only one peak appears at 1 V or less and a maximum value or less of the doped amount in which only one peak appears at 1 V or less. Also, the doped amount range (B) is preferably two thirds or more of a maximum value of the doped amount in which only one peak appears at 1 V or less. Also, the doped amount range (B) is more preferably three fourths or more of a maximum value of the doped amount in which only one peak appears at 1 V or less.

In an exemplary embodiment of the invention, after lithium is doped as mentioned above, lithium is dedoped. Lithium is preferably dedoped until SOC becomes 0%.

The current density at the lithium dedoping time is not particularly limited, but is preferably 0.2 A/cm$^2$ or less from the standpoint that a path is easily formed more uniformly, is more preferably 0.1 A/cm$^2$ or less, and is further preferably 0.05 A/cm$^2$ or less.

By doping and dedoping lithium according to a method of the exemplary embodiment of the invention, the charge and discharge reaction uniformly proceeds in later use of the negative electrode thereafter. This reason is presumed to be because the path through which lithium uniformly penetrates into silicon oxide is formed, but an exemplary embodiment of the invention is not particularly limited by this presumption.

The lithium doping into the negative electrode may be carried out before a battery is assembled or may be carried out in a battery after the battery has been assembled. From the standpoint of cost and man-hour, it is preferably carried out in the battery after assembling the battery. In the case where lithium is doped into the negative electrode in the battery, a part of lithium contained in the positive electrode can be used as the lithium source. Alternatively, a lithium source such as a lithium foil or a lithium alloying foil may be placed in a suitable place in the battery. In this case, it is necessary to take countermeasures such that an external terminal is attached to the lithium foil or the like in order to control the current for doping, and a separator is further placed in order to prevent a short-circuit with the negative electrode.

Also, in the case where lithium doping is carried out in the battery, by using a negative electrode half cell previously and separately prepared, it is possible to evaluate the maximum value of the lithium doped amount, in which only one peak due to the oxidation-reduction reaction of silicon oxide appears, and the upper limit of the current density with respect to the area of the negative electrode which is needed to obtain this maximum value.

Also, the upper limit of the current density with respect to the area of the negative electrode which is needed to obtain this maximum value of the doped amount, in which only one peak appears at 1 V or less, is different according to the thickness of the negative electrode, the amount of the electroconductive imparting agent in the negative electrode, the electrolyte used, and the like. Therefore, in the case where the lithium doping is carried out in the battery, a half cell using the same negative electrode and the same electrolyte as those used in the battery is previously produced, and the upper limit of the current density in the half cell is evaluated from the V-dQ/dV curve of the half cell, and the doping is preferably carried out at a current density of the upper limit or less.

The method for doping and dedoping lithium according to an exemplary embodiment of the invention can be carried out one or more time(s), and is preferably carried out two or more times. By repeating the method plural times, the negative electrode can have more excellent cycle property.

The reason, why the condition in the lithium doping for the first time after the negative electrode is produced is important, does not particularly limit the present invention, but is presumed to be because some kind of structural change, which make the state of localization of lithium in the silicon oxide unevenly distributed, occurs when lithium is quickly doped into the silicon oxide for the first time. Thus, in the production method of an exemplary embodiment of the invention, the condition in the lithium doping for the first time is important.

Note that, when the negative electrode, where the method for doping and dedoping lithium according to an exemplary embodiment of the invention has been carried out, is charged and discharged, a lower potential side peak appears at around 0.3 V and a higher potential side peak appears at around 0.5 V. The charged state is, for example, a state in which the SOC is that shows the charged state of the battery is 100%, while the discharged state is, for example, a state in which the SOC is 0%

Also, an exemplary embodiment of the invention can also be expressed as follows.

One of the exemplary embodiments of the invention is:

a method for doping and dedoping lithium for the first time after a negative electrode for a lithium secondary battery comprising silicon oxide as an active material is produced, comprising doping the lithium in a doped amount in which only one peak appears at 1 V or less on a V-dQ/dV curve and at a current value in which the doped amount becomes maximum, wherein the V-dQ/dV curve represents a relationship between voltage V of the negative electrode with respect to a lithium reference electrode and dQ/dV that is a ratio of variation dQ of lithium dedoped amount Q in the negative electrode to variation dV of the voltage V.

The lithium doping in an exemplary embodiment of the invention is carried out in the current value in which the doped amount, where only one peak appears at 1 V or less, becomes maximum.

It is more specifically explained using FIG. 2. The current value, in which a doped amount where only one peak appears at 1 V or less becomes maximum, is a current value in a current value range where the upper limit value of the doped amount in which only one peak appears at 1 V or less becomes approximately constant. For example, in the case where the silicon oxide is SiO, when the current density is approximately 0.12 A/cm$^2$ or less, the doped amount in which only one peak appears at 1 V or less becomes maximum. In a current value range where the current density is approximately 0.12 A/cm$^2$ or less, the upper limit value of the doped amount in which only one peak appears at 1 V or less becomes approximately constant and maximum, and the value is approximately 2300 mAh/g. In other words, in the case where the silicon oxide is SiO, the current value, in which a doped amount where only one peak appears at 1 V or less becomes maximum, is a current value where the doped amount in which only one peak appears at 1 V or less, is approximately 2300 mAh/g, and the current density of the current value is 0.12 A/cm$^2$ or less.

The amount of doped lithium is a doped amount in which only one peak appears at 1 V or less. Also, the amount of doped lithium is preferably a half or more of a maximum value of the doped amount in which only one peak appears at 1 V or less. Also, the amount of doped lithium is more preferably two thirds or more of a maximum value of the doped amount in which only one peak appears at 1 V or less. Also, the amount of doped lithium is further preferably three fourths or more of a maximum value of the doped amount in which only one peak appears at 1 V or less. Also, the amount of doped lithium is particularly preferably the maximum value of the doped amount in which only one peak appears at 1 V or less.

If lithium is doped to a maximum value of the doped amount in which only one peak appears at 1 V or less, it is understood that an exemplary embodiment of the invention includes a range of 5% more or 5% less than, preferably 3% more or 3% less than the maximum value of the doping amount, from the standpoint of the effect of the invention.

Also, the above-mentioned doping and dedoping can be carried out one or more time(s). If it is preferably carried out two or more times, the path of lithium can be more uniformly formed.

Note that, an exemplary embodiment of the invention can be understood as a method for producing a negative electrode or a secondary battery which has excellent cycle property.

As follows, an exemplary aspect of the present invention is explained in detail.

A lithium secondary battery of an exemplary embodiment of the invention can have a negative electrode, a positive electrode, an electrolyte liquid, a separator, and a package. As follows, each constituent of a lithium secondary battery of an exemplary embodiment of the invention is explained.

[Negative Electrode]

A lithium secondary battery of an exemplary embodiment of the invention has a negative electrode in which the method for doping and dedoping lithium according to an exemplary embodiment of the invention has been carried out. The negative electrode has a negative electrode active material containing silicon oxide. Also, the negative electrode is formed by placing the negative electrode active material on a negative electrode collector. The negative electrode active material can be bound on the negative electrode collector with a negative electrode binder.

The negative electrode active material of an exemplary embodiment of the invention contains silicon oxide as mentioned above. The silicon oxide is not particularly limited, but is represented by $SiO_x$ ($0<x<2$), for example. The silicon oxide may not contain lithium until the doping and dedoping processing of an exemplary embodiment of the invention are conducted. Also, the silicon oxide may contain Li, and the silicon oxide containing Li is represented by $SiLi_yO_z$ ($y>0$, $2>z>0$), for example. Also, the silicon oxide may contain a very small amount of a metal element or a non-metal element. The silicon oxide can contain one kind or two or more kinds of elements selected from, for example, nitrogen, boron, and sulfur in an amount of, for example, 0.1 to 5 mass %. By containing a very small amount of a metal element or a non-metal element, the electrical conductive property of the silicon oxide can be improved. Also, the silicon oxide may be crystalline or may be amorphous.

Figure 1:
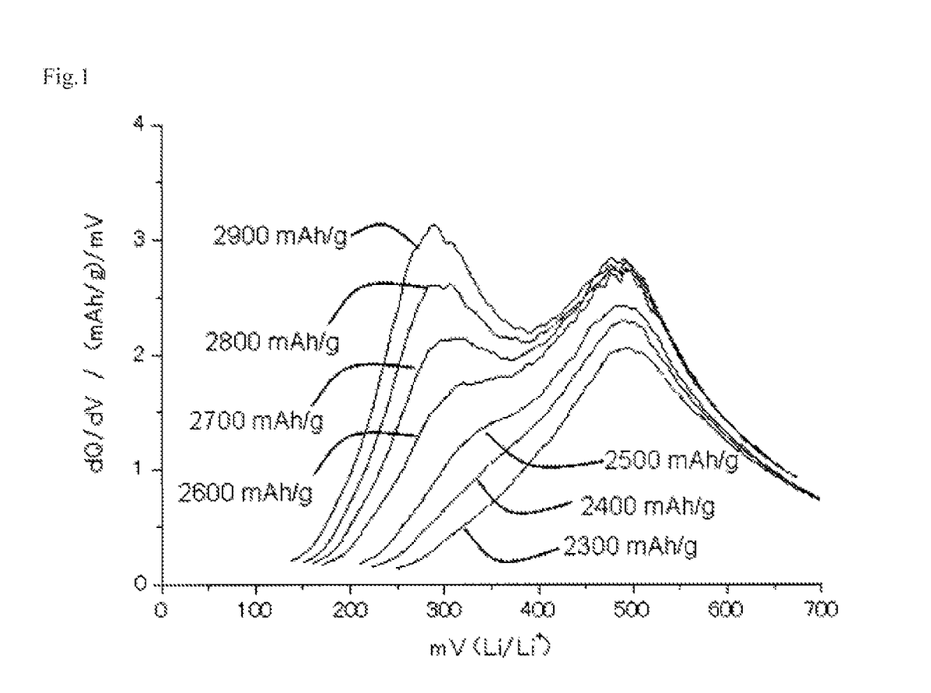
FIG. 1 is a V-dQ/dV curve at a dedoping time of a SiO negative electrode (the numbers [mAh/g] represent a lithium doped amount with respect to a unit weight of SiO.).

Note that, in the case of adding a very small amount of a metal element or a non-metal element in silicon oxide, the potential where a peak appears may be slightly shifted from 300 mV or 500 mV which are shown in FIG. 1. However, there is no change regarding the point in which the single peak appears when the amount of doped lithium is small, and in which another peak appears at a low potential side when the amount of doped lithium exceeds a certain value. Therefore, the maximum value of the amount of doped lithium, in which only one peak derived from an oxidation-reduction reaction appears, like the case of SiO, and the upper limit of the current density with respect to the unit area of the negative electrode, which is required to obtain the maximum value, can be evaluated.

The negative electrode can contain an electroconductive imparting agent. As the electroconductive imparting agent, a known agent can be used. Examples thereof preferably include, for example, carbon materials. Examples of the carbon material include, for example, graphite, amorphous carbon, diamond-like carbon, carbon nanotube, or a complex thereof. Here, graphite having high crystallinity has high electroconductivity and excellent adhesiveness with a collector that is made of metal such as copper or the like as well as excellent voltage flatness. On the other hand, since amorphous carbon having low crystallinity has relatively low volume expansion, this has a high effect of reducing the volume expansion of the entire negative electrode, and deterioration due to ununiformity such as a crystal grain boundary or a defect hardly occurs.

The content of the silicon oxide in the negative electrode active material is preferably 40 mass % or more and 99 mass % or less from the standpoint of the effect of improving the cycle property, is more preferably 50 mass % or more and 95 mass % or less, and is further preferably 60 mass % or more and 90 mass % or less.

The content of the carbon material in the negative electrode active material is preferably 1 mass % or more and 40 mass % or less, and is more preferably 2 mass % or more and 30 mass % or less.

All or a part of the silicon oxide in the negative electrode active material preferably has an amorphous structure. The silicon oxide having an amorphous structure is thought to have a relatively small constituent due to ununiformity such as a crystal grain boundary or a defect. Note that, X-ray diffraction measurement (general XRD measurement) can confirm that all or a part of the silicon oxide has an amorphous structure. Specifically, in the case where the silicon oxide does not have an amorphous structure, a peak peculiar to the silicon oxide is observed, while in the case where all or a part of the silicon oxide has an amorphous structure, the observed peak peculiar to the silicon oxide becomes broad.

The silicon oxide and the carbon material are not particularly limited, but a particulate silicon oxide and a particulate carbon can be used.

A negative electrode active material containing silicon oxide and a carbon material can be obtained by, for example, a mixing by mechanical milling. Also, the negative electrode active material contains silicon oxide and a carbon material can be obtained by, for example, a CVD processing of silicon oxide in an atmosphere containing organic substance gas such as methane. In this case, by selecting a condition, a complex in which silicon oxide is coated with a carbon material can be obtained.

As a negative electrode binder, for example, a polyvinylidene fluoride (PVdF), a vinylidene fluoride-hexafluoropropylene copolymer, a vinylidene fluoride-tetrafluoroethylene copolymer, a styrene-butadiene copolymerized rubber, a polytetrafluoroethylene, a polypropylene, a polyethylene, a polyimide, a polyamide-imide, or the like can be used. Among these, from the standpoint of the strong binding property, a polyimide or a polyamide-imide is preferable. The amount of the negative electrode binder used is preferably 5 to 25 parts by mass with respect to 100 parts by mass of the negative electrode active material, from the standpoint of "sufficient binding force" and "high energy" which are trade-offs.

A negative electrode collector is not particularly limited, but is preferably aluminum, nickel, copper, silver, and an alloy thereof from the electrochemical stability. Examples of the shape thereof include foil, flat plate, and mesh.

A negative electrode can be produced by, for example, forming a negative electrode active material layer containing a negative electrode active material and a negative electrode binder on a negative electrode collector. Examples of the method for forming the negative electrode active material layer include doctor blade method, die coater method, CVD method, and sputtering method. A negative electrode active material layer is first formed, and a thin film of aluminum, nickel, or an alloy thereof is thereafter formed by vapor deposition, sputtering, or the like, which leads to be a negative electrode.

[Positive Electrode]

A positive electrode is formed by placing a positive electrode active material on a positive electrode collector. The positive electrode active material can be bound on the positive electrode collector with a positive electrode binder.

The positive electrode active material is not particularly limited, but examples thereof include, for example, lithium manganates having a lamellar structure or lithium manganates having a Spinel structure such as $LiMnO_2$ and $Li_xMn_2O_4$ (0<x<2); $LiCoO_2$, $LiNiO_2$, or a compound in which a part of the transition metal thereof is substituted by another metal. Also, examples of the positive electrode active material also include, for example, $LiFePO_4$ having an Olivine conformation. These positive electrode active materials can be used alone, or in combination with two or more kinds.

As a positive electrode binder, the same materials for a negative electrode binder can be used. Among these, from the standpoint of versatility and low cost, polyvinylidene fluorides are preferable. The amount of the positive electrode binder used is preferably 2 to 10 parts by mass with respect to 100 parts by mass of the positive electrode active material from the standpoint of "sufficient binding force" and "high energy" which are trade-offs.

As a positive electrode collector, the same materials for a negative electrode collector can be used.

For the purpose of decreasing impedance, an electroconductive auxiliary material may be added to a positive electrode active material layer containing a positive electrode active material. Examples of the electroconductive auxiliary material include carbonaceous fine particles such as graphite, carbon black, and acetylene black.

[Electrolyte Liquid]

The material of an electrolyte liquid is not particularly limited as long as it is stable at an oxidation-reduction potential of metal lithium, and a known non-aqueous electrolyte liquid can be adopted.

The electrolyte liquid is preferably a liquid obtained by dissolving an electrolyte salt in a non-aqueous electrolyte solvent.

The non-aqueous electrolyte solvent is not particularly limited. From the reason of stability at an oxidation-reduction potential of metal lithium, examples thereof include, cyclic-type carbonates such as propylene carbonate, ethylene carbonate, butylene carbonate, and vinylene carbonate; chain-type carbonate such as dimethyl carbonate, diethyl carbonate, ethyl methyl carbonate, and dipropyl carbonate; and lactones such as γ-butyrolactone. The non-aqueous electrolyte liquid can be used alone, or in combination with two or more kinds.

Examples of the electrolyte salt include, for example, lithium salts such as $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$. The electrolyte salt can be used alone, or in combination with two or more kinds.

Also, alternatively, an ionic liquid can be used as the electrolyte liquid. Examples of the ionic liquid include, for example, quaternary ammonium-imide salts.

Also, examples of the electrolyte liquid include not only liquid materials but also solid materials. Examples of the solid electrolyte include, for example, gel polymer electrolytes obtained by impregnating a polymer such as a polyacrylonitrile or a polyacrylate with the above-mentioned electrolyte liquid in a liquid state; and solid electrolytes such as LiPON and $Li_2S$—$LiP_xO_y$ (x=1 to 2, y=2 to 4).

[Separator]

A separator is not particularly limited, and a known separator can be adopted. As the separator, a porous film or a nonwoven cloth of polypropylene, polyethylene, or the like can be used.

[Package]

A secondary battery according to an exemplary embodiment of the invention can be a constitution where an electrode assembly in which a positive electrode and a negative electrode are oppositely disposed and in which an electrolyte liquid are enclosed inside a package. As the shape of the secondary battery, any one of cylindrical type, flat wound rectangular type, stacked rectangular type, coin type, flat wound laminate type, and stacked laminate type can be adopted.

A package can be appropriately selected as long as it is stable against an electrolyte liquid and it has a sufficient water vapor barrier property, and is particularly limited. For example, a metal can or a lamination film can be used as the package. It is preferable to use an aluminum lamination film from the standpoint of reducing volume expansion.

The lower potential side peak is not particularly limited, but is a peak that appears at around 0.3 V, and the higher potential side peak is a peak that appears at around 0.5 V.

The charge state is a state in which the SOC showing the charge state of the battery is, for example, 100%, and the discharge state is a state in which the SOC is, for example, 0%.

Each peak intensity is obtained by approximating the peak with Gauss function and by calculating the area.

An exemplary embodiment of the invention was explained, but when it is understood that carrying out the above-mentioned method for doping and dedoping lithium leads to the production of a negative electrode, an exemplary aspect of the present invention can also be expressed as a method for producing a negative electrode for a lithium secondary battery as follows.

A method for producing a negative electrode for a lithium secondary battery, comprising:

(1) forming a negative electrode active material layer comprising silicon oxide as an active material, and (2) doping and dedoping lithium into and from the negative electrode active material layer, wherein the doping in step (2) is carried out within the following current value range (A) and within the following doped amount range (B);

current value range (A): a range of a current value in which a doped amount where only one peak appears at 1 V or less on the V-dQ/dV curve becomes maximum, wherein the V-dQ/dV curve represents a relationship between voltage V of the negative electrode active material layer with respect to a lithium reference electrode and dQ/dV that is a ratio of variation dQ of lithium dedoped amount Q in the negative electrode active material layer to variation dV of the voltage V, and doped amount range (B): a range of a doped amount in which only one peak appears at 1 V or less on the V-dQ/dV curve.

The negative electrode active material layer is preferably formed on the negative electrode collector. Also, in this case, the negative electrode for a lithium secondary battery can be obtained by doping lithium according to the above-mentioned method in the negative electrode precursor consisting of a negative electrode collector and a negative electrode active material layer.

The step (2) is performed at least one time, but is preferably repeated plural times.

Also, an exemplary aspect of the present invention can also be expressed as a method for producing a negative electrode for a lithium secondary battery as follows.

A method for producing a negative electrode for a lithium secondary battery, comprising:

(1) forming a negative electrode active material layer comprising silicon oxide as an active material, and (2) doping and dedoping lithium into and from the negative electrode active material layer, wherein the doping in step (2) is carried out in a doped amount in which only one peak appears at 1 V or less on a V-dQ/dV curve and at a current value in which the doped amount becomes maximum, wherein the V-dQ/dV curve represents a relationship between voltage V of the negative electrode active material layer with respect to a lithium reference electrode and dQ/dV that is a ratio of variation dQ of lithium dedoped amount Q in the negative electrode active material layer to variation dV of the voltage V.

EXAMPLES

Negative Electrode

Silicon monoxide (average particle diameter $D_{50}$=25 μm) made by Kojundo Chemical Laboratory Co., Ltd., carbon black (made by Mitsubishi Chemical Corporation, #3030B), and a polyamic acid (made by Ube Industries, trade name: U varnish A) were respectively weighed at a mass ratio of 83:2: 15, and they were mixed with n-methylpyrrolidone (NMP) by using a homogenizer to prepare a negative electrode slurry. The mass ratio of the NMP and the solid component was set to be 57:43. The negative electrode slurry was applied on a copper foil having a thickness of 10 μm using a doctor blade. It was heated at 120° C. for 7 minutes and the NMP was dried to obtain a negative electrode. Plural negative electrodes were produced. After that, the negative electrode was heated using an electrical furnace in nitrogen atmosphere at 350° C. for 30 minutes.

<Positive Electrode>

Lithium cobaltate made by Nichia Corporation, carbon black (made by Mitsubishi Chemical Corporation, #3030B), and a polyvinylidene fluoride (made by KUREHA CORPORATION, #2400) were respectively weighed at a mass ratio of 95:2:3, and they were mixed with n-methylpyrrolidone (NMP) to prepare a positive electrode slurry. The mass ratio of the NMP and the solid component was set to be 52:48. The positive electrode slurry was applied on an aluminum foil having a thickness of 15 μm using a doctor blade, and it was then heated at 120° C. for 5 minutes for drying. Plural positive electrodes were produced.

<Production of Half Cell>

A half cell was produced using the negative electrode that was obtained and metal lithium as an opposite electrode. As an electrolyte liquid, a mixed solvent of ethylene carbonate and diethyl carbonate at 7:3 (volume ratio) which contains 1.0 mol/l of $LiPF_6$ electrolyte salt was used.

Then, the half cell of the negative electrode was charged and discharged in a range of 3.0 to 4.2 V to obtain a V-dQ/dV curve at the lithium dedoping time when the lithium doped amount into the negative electrode and the doping current density were changed.

The amount of doped lithium was selected from 1500 to 2800 mAh/g, and the doping current density with respect to the unit area of the negative electrode was selected from the range of 0.02 to 0.24 mA/cm$^2$. The current density at the lithium dedoping time was set to be 0.01 mA/cm$^2$ at all times.

The V-dQ/dV curve at the lithium dedoping time in the case where the doping current density is 0.02 mA/cm$^2$ is shown in FIG. 1. From the figure, it is found that when the lithium doped amount with respect to the unit weight of silicon oxide is 2300 mAh/g or less, only one peak appears at 1 V or less on the V-dQ/dV curve at the lithium dedoping time.

The data analysis was conducted by a fitting using the above-mentioned ORIGIN (software for data analysis made by ORIGINLAB CORPORATION).

Also, the doping current density with respect to the unit area of the negative electrode was changed, and the upper limit of the lithium doped amount in which only one peak appears at 1 V or less on the V-dQ/dV curve at the lithium dedoping time was obtained. The result is shown in FIG. 2. From FIG. 2, in the case where the dope current density is 0.12 mA/cm$^2$ or less, the upper limit of the lithium doped amount in which only one peak appears at 1 V or less on the V-dQ/dV curve at the lithium dedoping time is approximately constantly 2300 mAh/g. Also, it is found that when the current density becomes larger than 0.12 mA/cm$^2$, the upper limit of the lithium doped amount in which only one peak appears at 1 V or less accordingly becomes smaller.

From this result, it is found that when lithium is doped into the negative electrode in the condition in which the doping current density is set to be 0.12 mA/cm$^2$ or less and in which the lithium doped amount with respect to the unit weight of silicon oxide is set to be 2300 mAh/g, lithium can be uniformly doped into this negative electrode.

<Secondary Battery>

An aluminum terminal and a nickel terminal were respectively welded to the above-mentioned positive electrode and negative electrode. These were stacked through a separator to produce an electrode assembly. The positive electrode contains lithium which can dope 2650 mAh/g of lithium with respect to the unit weight of silicon oxide contained in the negative electrode.

The electrode assembly was packaged with a laminate film, and an electrolyte liquid was supplied thereto. After that, the laminate film was thermally heat-bonded and sealed under reduced pressure to produce plural flat plate-type lithium secondary batteries. As a separator, a polypropylene film was used. As a laminate film, a polypropylene film on which aluminum was deposited was used. As an electrolyte liquid, a mixed solvent of ethylene carbonate and diethyl carbonate at 7:3 (volume ratio) which contains 1.0 mol/l of $LiPF_6$ electrolyte salt was used.

Example 1

Lithium Doping into Negative Electrode in Battery

In the produced lithium secondary battery, after 18 hours have passed since the electrolyte liquid was supplied, lithium doping into the negative electrode was carried out by setting the current density with respect to the unit area of the negative electrode to be 0.02 mA/cm$^2$. The lithium doped amount with respect to a unit weight of silicon oxide contained in the negative electrode was set to be 2300 mAh/g.

After the doping, the battery was discharged to 3.0 V at the current density of 0.02 mA/cm$^2$ to lead to dedoping lithium from the negative electrode.

<Evaluation of Lithium Secondary Battery>

Then, a charge and discharge cycle test was carried out in a range of 3.0 to 4.2 V.

The charge was carried out by CCCV system (the constant current density is 0.2 mA/cm$^2$ to 4.2 V and, after reaching 4.2 V, the voltage is kept constant for 1 hour). The discharge was carried out by CC system (the constant current density is 0.2 mA/cm$^2$).

For the charge and discharge cycle test, a charged and discharge testing equipment ACD-100M made by ASKA Electronic Co., Ltd. was used.

Examples 2 to 5

The charge and discharge cycle tests were carried out in the same manner as in Example 1 except that the current densities with respect to the unit area of the negative electrode in the lithium doping into the negative electrode in the batteries were respectively set to be 0.03, 0.06, 0.09, and 0.12 mA/cm$^2$.

Comparative Examples 1 to 4

The charge and discharge cycle tests were carried out in the same manner as in Example 1 except that the current densities with respect to the unit area of the negative electrode in the lithium doping into the negative electrode in the batteries were respectively set to be 0.15, 0.18, 0.21, and 0.24 mA/cm$^2$.

Figure 3:
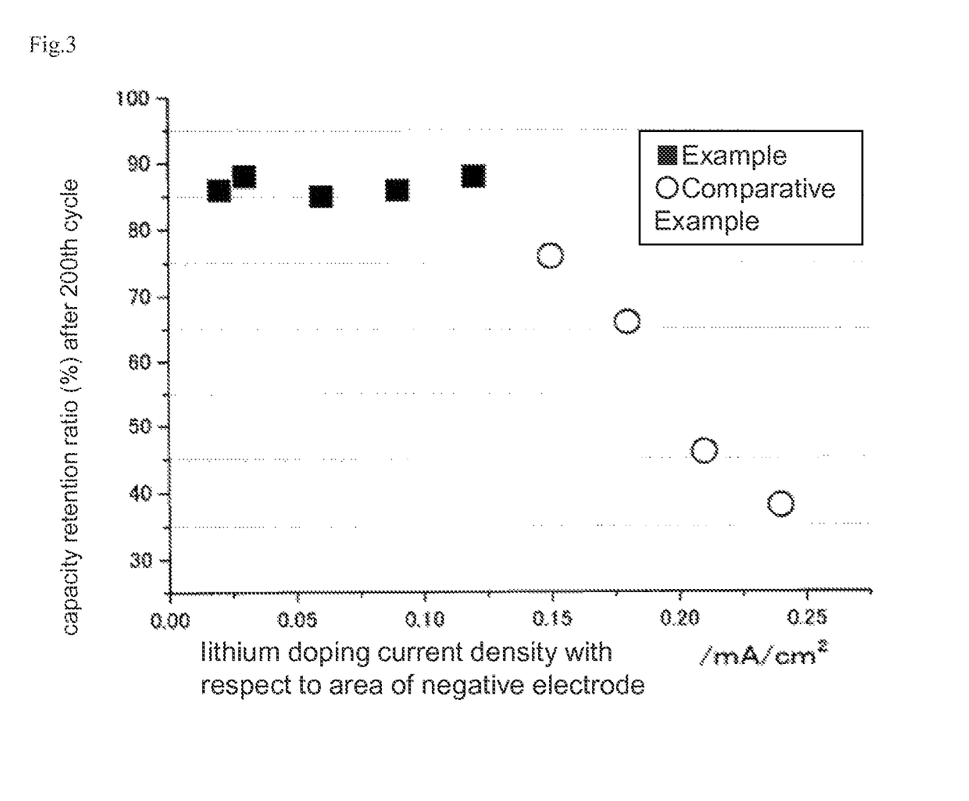
FIG. 3 is a graph showing capacity retention ratios after a charge and discharge cycle test in the Examples and the Comparative Examples.

The capacity retention ratios at 200$^{th}$ cycle of the lithium secondary batteries of the Examples and the Comparative Examples are shown in TABLE 1 and FIG. 3. Here, the capacity retention ratio represents a ratio of the 200$^{th}$ discharge capacity with respect to the discharge capacity at the first cycle.

TABLE 1

|  | capacity retention ratio (%) at 200$^{th}$ cycle |
| --- | --- |
| Ex. 1 | 86% |
| Ex. 2 | 88% |
| Ex. 3 | 85% |
| Ex. 4 | 86% |
| Ex. 5 | 88% |
| Comp. Ex. 1 | 74% |
| Comp. Ex. 2 | 66% |
| Comp. Ex. 3 | 46% |
| Comp. Ex. 4 | 38% |

As is obvious from TABLE 1, the capacity retention ratios after 200 cycles of the batteries of Examples 1 to 5 are each 85% or more while the capacity retention ratios after 200 cycles of the batteries of Comparative Examples 1 to 4 are 74% or less.

As indicated in the above, by using a method for doping and dedoping lithium according to an exemplary embodiment of the invention, a lithium secondary battery having an excellent capacity retention ratio after a charge and discharge cycle can be provided.

An exemplary aspect of the present invention can also be expressed as shown in following the Additional statements.

(Additional Statement 1)

A method for doping and dedoping lithium for the first time after a negative electrode for a lithium secondary battery comprising silicon oxide as an active material is produced, comprising doping the lithium within the following current value range (A) and within the following doped amount range (B);
current value range (A): a range of a current value in which a doped amount where only one peak appears at 1 V or less on the V-dQ/dV curve becomes maximum, wherein the V-dQ/dV curve represents a relationship between voltage V of the negative electrode with respect to a lithium reference electrode and dQ/dV that is a ratio of variation dQ of lithium dedoped amount Q in the negative electrode to variation dV of the voltage V, and
doped amount range (B): a range of a doped amount in which only one peak appears at 1 V or less on the V-dQ/dV curve.

(Additional Statement 2)

The method for doping and dedoping lithium according to Additional statement 1, wherein the doped amount range (B) is a half or more of a maximum value of the doped amount in which only one peak appears at 1 V or less and a maximum value or less of the doped amount in which only one peak appears at 1 V or less.

(Additional Statement 3)

The method for doping and dedoping lithium according to Additional statement 1 or 2,
wherein the silicon oxide is SiO,
wherein the current density of the current value range (A) is more than 0 and 0.12 A/cm$^2$ or less, and
wherein the dope quantity range (B) is about 2300 mAh/g or less.

(Additional Statement 4)

A method for doping and dedoping lithium for the first time after a negative electrode for a lithium secondary battery comprising silicon oxide as an active material is produced, comprising doping the lithium
in a doped amount in which only one peak appears at 1 V or less on a V-dQ/dV curve and at a current value in which the doped amount becomes maximum, wherein the V-dQ/dV curve represents a relationship between voltage V of the negative electrode with respect to a lithium reference electrode and dQ/dV that is a ratio of variation dQ of lithium dedoped amount Q in the negative electrode to variation dV of the voltage V.

(Additional Statement 5)

The method for doping and dedoping lithium according to Additional statement 4, wherein the doped amount is a maximum value in which only one peak appears at 1 V or less.

(Additional Statement 6)

The method for doping and dedoping lithium according to Additional statement 5,
wherein the silicon oxide is SiO,
wherein the current density of the current value is more than 0 and 0.12 A/cm$^2$ or less, and
wherein the doped amount is about 2300 mAh/g.

(Additional Statement 7)

The method for doping and dedoping lithium according to any one of Additional statements 1 to 6, wherein the current density at the dedoping time is 0.2 A/cm$^2$ or less.

(Additional Statement 8)

The method for doping and dedoping lithium according to any one of Additional statements 1 to 7, wherein the peak is derived from an oxidation-reduction reaction of the silicon oxide.

(Additional Statement 9)

A negative electrode for a lithium secondary battery in which lithium is doped and dedoped by using the method according to any one of Additional statements 1 to 8.

(Additional Statement 10)

A lithium secondary battery, comprising the negative electrode according to Additional statement 9.

This application claims the priority based on Japanese Patent Application No. 2011-119232, filed on May 27, 2011, all the disclosure of which is incorporated herein by reference.

The present invention was explained with reference to embodiments and Examples, but the present invention is not limited to the above-mentioned embodiments and the Examples. In the construction and the detail of the present invention, various changes which are understood by a person ordinarily skilled in the art can be made within the scope of the invention.

What is claimed is:

1. A method for producing a negative electrode for a lithium secondary battery, comprising:
(1) forming a negative electrode active material layer comprising silicon oxide as an active material, and (2) doping and dedoping lithium into and from the negative electrode active material layer,
wherein the doping in step (2) is carried out in a doped amount in which only one peak appears at 1 V or less on a V-dQ/dV curve and at a current value in which the doped amount becomes maximum, wherein the V-dQ/dV curve represents a relationship between voltage V of the negative electrode active material layer with respect to a lithium reference electrode and dQ/dV that is a ratio of variation dQ of lithium dedoped amount Q in the negative electrode active material layer to variation dV of the voltage V.

2. The method for producing a negative electrode for a lithium secondary battery according to claim 1, wherein the doped amount is a maximum value in which only one peak appears at 1 V or less.

3. The method for producing a negative electrode for a lithium secondary battery according to claim 2,
wherein the silicon oxide is SiO,
wherein the current density of the current value is more than 0 and 0.12 A/cm² or less, and
wherein the doped amount is about 2300 mAh/g.

4. The method for producing a negative electrode for a lithium secondary battery according to claim 1, wherein the current density at the dedoping time in step (2) is 0.2 A/cm² or less.

5. The method for producing a negative electrode for a lithium secondary battery according to claim 1, wherein the peak is derived from an oxidation-reduction reaction of the silicon oxide.

6. A lithium secondary battery, comprising a negative electrode for a lithium secondary battery which is obtained by the production method according to claim 1.

7. A method for doping and dedoping lithium for the first time after a negative electrode for a lithium secondary battery comprising silicon oxide as an active material is produced, comprising doping the lithium
in a doped amount in which only one peak appears at 1 V or less on a V-dQ/dV curve and at a current value in which the doped amount becomes maximum, wherein the V-dQ/dV curve represents a relationship between voltage V of the negative electrode with respect to a lithium reference electrode and dQ/dV that is a ratio of variation dQ of lithium dedoped amount Q in the negative electrode to variation dV of the voltage V.

8. The method for doping and dedoping lithium according to claim 7, wherein the doped amount is a maximum value in which only one peak appears at 1 V or less.

9. The method for doping and dedoping lithium according to claim 7, wherein the current density at the dedoping time is 0.2 A/cm² or less.

10. A negative electrode for a lithium secondary battery in which lithium is doped and dedoped by the method according to claim 7.

11. The method for producing a negative electrode for a lithium secondary battery according to claim 2, wherein the current density at the dedoping time in step (2) is 0.2 A/cm² or less.

12. The method for producing a negative electrode for a lithium secondary battery according to claim 3, wherein the current density at the dedoping time in step (2) is 0.2 A/cm² or less.

13. The method for producing a negative electrode for a lithium secondary battery according to claim 2, wherein the peak is derived from an oxidation-reduction reaction of the silicon oxide.

14. The method for producing a negative electrode for a lithium secondary battery according to claim 3, wherein the peak is derived from an oxidation-reduction reaction of the silicon oxide.

15. The method for producing a negative electrode for a lithium secondary battery according to claim 4, wherein the peak is derived from an oxidation-reduction reaction of the silicon oxide.

16. The method for doping and dedoping lithium according to claim 8, wherein the current density at the dedoping time is 0.2 A/cm² or less.

17. A negative electrode for a lithium secondary battery in which lithium is doped and dedoped by the method according to claim 8.

18. A negative electrode for a lithium secondary battery in which lithium is doped and dedoped by the method according to claim 9.

* * * * *